United States Patent
Andersen et al.

(10) Patent No.: US 10,886,797 B2
(45) Date of Patent: Jan. 5, 2021

(54) SUPPORT STRUCTURE SEGMENT FOR A GENERATOR OF A WIND TURBINE

(71) Applicant: Siemens Gamesa Renewable Energy A/S, Brande (DK)

(72) Inventors: Mads Peter Zippor Leth Andersen, Låsby (DK); Bo Nedergaard Jacobsen, Odder (DK); Saravanan Jayaraman, Ikast (DK); Stefan Schaldemose, Brande (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/607,429

(22) PCT Filed: Jan. 31, 2018

(86) PCT No.: PCT/EP2018/052353
§ 371 (c)(1),
(2) Date: Oct. 23, 2019

(87) PCT Pub. No.: WO2018/197057
PCT Pub. Date: Nov. 1, 2018

(65) Prior Publication Data
US 2020/0136442 A1    Apr. 30, 2020

(30) Foreign Application Priority Data

Apr. 24, 2017 (DE) .......................... 10 2017 206 873

(51) Int. Cl.
*H02K 5/00* (2006.01)
*H02K 1/18* (2006.01)
(Continued)

(52) U.S. Cl.
CPC ............... *H02K 1/187* (2013.01); *F03D 9/25* (2016.05); *H02K 1/20* (2013.01); *H02K 7/183* (2013.01); *H02K 15/028* (2013.01)

(58) Field of Classification Search
CPC ..... Y02E 10/72; Y02E 10/728; H02K 7/1838; H02K 7/183; H02K 7/1823; H02K 5/26; H02K 15/14
(Continued)

(56) References Cited

U.S. PATENT DOCUMENTS

| 7,772,738 B2 * | 8/2010 | Huppunen | ............... H02K 1/16 310/216.001 |
| 7,923,890 B2 * | 4/2011 | Boardman, IV | ....... H02K 1/185 310/216.129 |

(Continued)

FOREIGN PATENT DOCUMENTS

| DE | 102014209582 A1 | 11/2014 |
| EP | 2182612 A1 | 5/2010 |

(Continued)

OTHER PUBLICATIONS

International Search Report for application No. PCT/EP2018/052353 dated May 17, 2018.

*Primary Examiner* — Thanh Lam
(74) *Attorney, Agent, or Firm* — Schmeiser, Olsen & Watts LLP

(57) ABSTRACT

Provided is a support structure segment for a stator of a generator, in particular of a wind turbine, wherein the support structure segment includes a carrier element extending in an axial direction AD, wherein the carrier element includes a base section, a side section and a top section, and wherein the top section is configured to be coupled to a lamination sheet section of the stator by means of a fixing connection.

15 Claims, 10 Drawing Sheets

(51) Int. Cl.
*F03D 9/25* (2016.01)
*H02K 1/20* (2006.01)
*H02K 7/18* (2006.01)
*H02K 15/02* (2006.01)

(58) Field of Classification Search
USPC ........ 310/89–91, 216.008, 400–433; 290/44, 290/55
See application file for complete search history.

(56) References Cited

U.S. PATENT DOCUMENTS

| | | | | |
|---|---|---|---|---|
| 8,710,720 | B2* | 4/2014 | Stiesdal | H02K 1/148 |
| | | | | 310/432 |
| 9,509,182 | B2* | 11/2016 | Yamarthi | H02K 1/185 |
| 9,673,668 | B2* | 6/2017 | Kanakamedala | H02K 1/18 |
| 2009/0256431 | A1* | 10/2009 | Stiesdal | H02K 9/22 |
| | | | | 310/45 |
| 2011/0266913 | A1 | 11/2011 | Zirin et al. | |
| 2015/0349592 | A1* | 12/2015 | Winkler | H02K 1/185 |
| | | | | 310/89 |

FOREIGN PATENT DOCUMENTS

| | | |
|---|---|---|
| EP | 2424077 A2 | 2/2012 |
| EP | 2621054 A1 | 7/2013 |
| EP | 2975729 A1 | 1/2016 |
| FR | 3011991 A1 | 4/2015 |

* cited by examiner

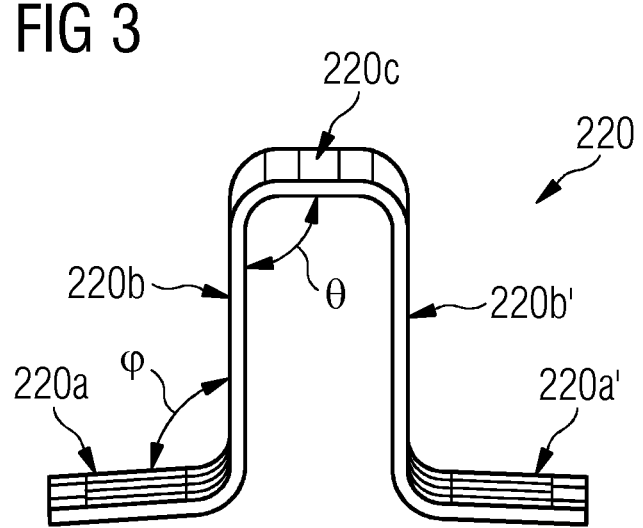
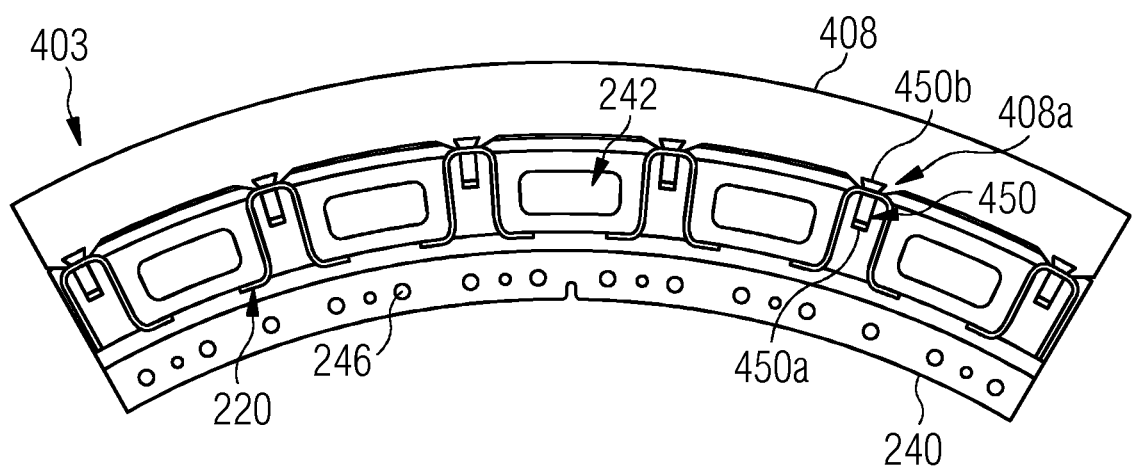

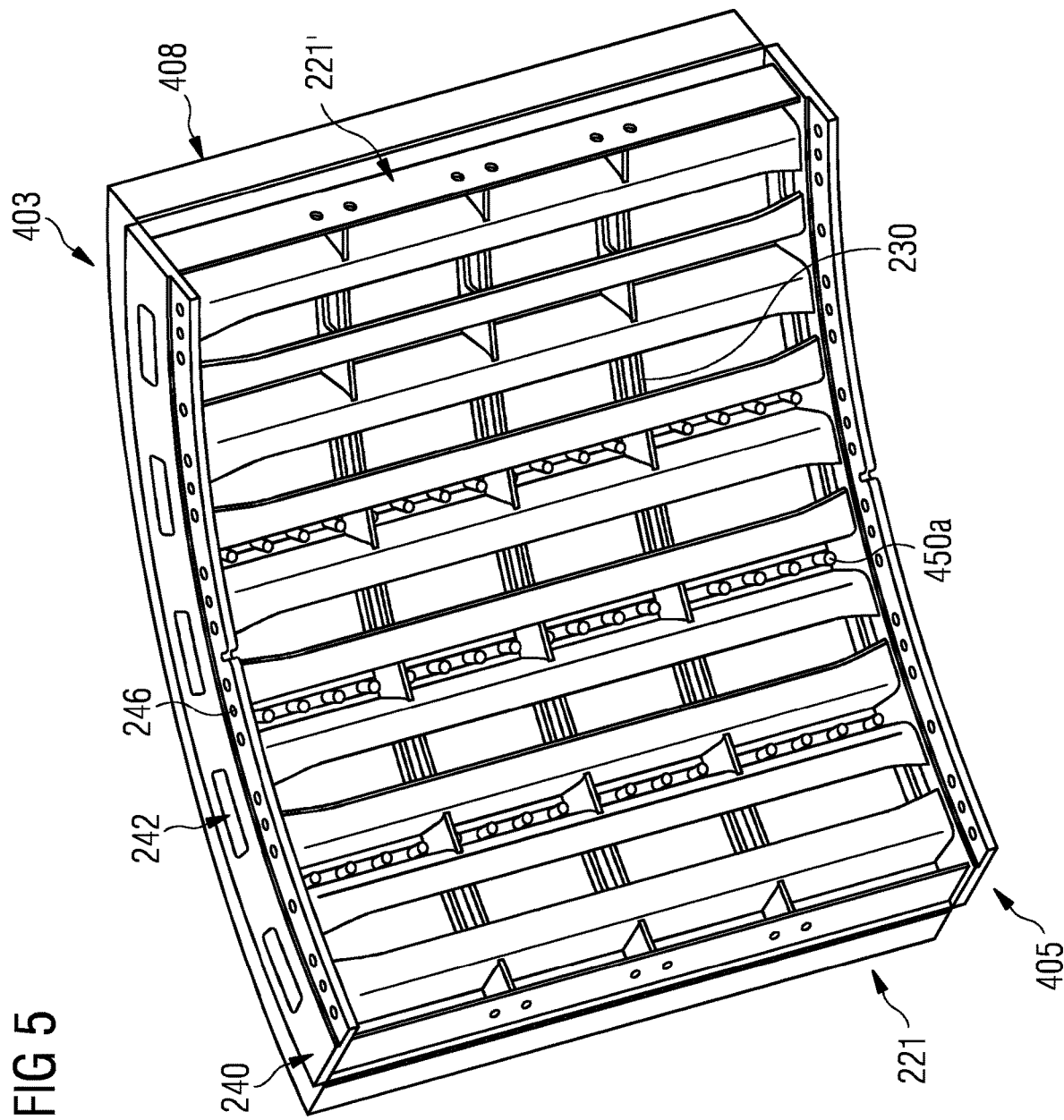

SUPPORT STRUCTURE SEGMENT FOR A GENERATOR OF A WIND TURBINE

CROSS-REFERENCE TO RELATED APPLICATIONS

This application claims priority to PCT Application No. PCT/EP2018/052353, having a filing date of Jan. 31, 2018, which is based on German Application No. 10 2017 206 873.6, having a filing date of Apr. 24, 2017, the entire contents both of which are hereby incorporated by reference.

FIELD OF TECHNOLOGY

The following relates to a support structure segment for a generator of a wind turbine, a stator for a generator of a wind turbine comprising a plurality of such support structure segments and method for manufacturing the same.

BACKGROUND

Wind turbines typically include multiple blades for generating mechanical rotation energy. A generator within the wind turbine is configured to generate electrical power as the blades are driven to rotate by the wind. Wind turbines are therefore designed to efficiently translate wind energy into rotational motion, thereby providing the generator with sufficient rotational energy for electrical power generation.

The generator of the wind turbine comprises a stator and a rotor. There are designs, which have the rotor arranged radially outward with respect to the stator.

In a different design the stator is arranged radially outward with respect to the rotor. The stator comprise a lamination sheet section which lamination sheet section comprises the coils for electrical power generation. The rotor comprises a plurality of magnets. Upon rotation of the magnets, rotational energy is converted into electrical power.

The segmented lamination sheet stacks of the stator need to be placed at a specified distance to the magnets of the rotor. To this end, a support structure is incorporated in the stator between the lamination sheet section of the stator and the rotor.

Such a support structure needs to provide versatile functions. It has to prevent collision between the stator and rotor, in particular regarding the significant radial and tangential electromagnetic (EM) forces which are generated within the active generator. Further, it has to prevent the occurrence of coinciding eigenfrequencies of the segmented assembly and electromagnetic excitation force frequencies. Furthermore, the support structure needs to withstand all generator load conditions in the long term, i.e. preferably during the whole lifetime of the generator, and should enable efficient cooling by channeling of cooling air.

Support structures as part of a stator are known in the state of the art. The support structure may comprise a carrier element. The carrier element is employed for coupling the support structure segment, and therefore the support structure as a whole, to the lamination sheet section of the stator. The carrier elements in such support structures known from the state of the art are T-profile type carrier elements. Such carrier elements have a base section, wherein at the center of the base section a solid perpendicular element is placed.

Due to a limited surface area of the center element, coupling of the support structure to the lamination sheet section of the stator may result in limited stability connections. Such connections may not be sufficient to meet the stability requirements of modern wind turbines.

Further, conventional connections may be disadvantageous since the interface between the support structure and the lamination sheet section might be inaccessible when the stator is manufactured. Therefore, it might be difficult to establish the connection in the first place due to spatial limitations during the manufacturing process.

Furthermore, conventional connections as described in the state of the art may also become disadvantageous when the stator needs to be repaired during the lifetime of the generator as the relevant positions may not be readily accessible.

SUMMARY

An aspect relates to provide a support structure for a stator, in particular for use in a generator of a wind turbine, which fulfils the requirements regarding mechanical stability and which at the same time can be manufactured in a cost-efficient way and allows for easy maintenance during the whole lifetime of the generator.

This object may be solved by a support structure segment, a stator and a method for manufacturing the stator according to the subject matter of the independent claims.

One aspect of the embodiment of the invention relates to a support structure segment for a stator of a generator, in particular of a wind turbine, wherein the support structure segment comprises a carrier element extending in an axial direction, wherein the carrier element comprises a base section, a side section and a top section, wherein, (in a profile view), the base section and the side section are oriented relative to each other at an outer angle φ (phi) in a range of approximately 700 to approximately 1300, the side section and the top section are oriented relative to each other at an inner angle θ (theta) in a range of approximately 70° to approximately 1300, the base section is coupled to the side section, the side section is coupled to the top section, the base section is spaced apart from the top section essentially in a radial direction, and the top section is configured to be coupled to a lamination sheet section of the stator by means of a fixing connection, preferably a dovetail joint connection, and wherein the fixing connection is attached to the top section preferably by means of a bolt connection.

The carrier elements according to the embodiment of the invention are preferably single piece elements and are not constituted by multiple different components. In the case of multi-constituent type carrier elements, it is required to assemble at least the base section and the separate perpendicular element at its centre. In contrast, the manufacture of a single component carrier elements according to an embodiment of the invention may be inexpensive and does not require individually adapting the size and measures of the carrier elements to the size and measures of the generator which it is provided for. Therefore, scaling of the support structure, i.e. adjusting the support structure to generators of different sizes and measures, may be possible. Preferably, the term "single component carrier element" means in the context of the present embodiment of the invention that at least one carrier element comprises at least one base section and at least one side section and at least one top section, which form together a single piece of material and/or being manufactured from a single piece of material. More particularly, the at least one carrier element comprises preferably at least one base section, at least one further base section, at least one side section, at least one further side section and at least one top section which all together form a single piece of material and/or being manufactured from a single piece of material.

The base section, the side section and the top section of the carrier element describe for example a Z-type profile. More preferably, in an exemplary embodiment as described further below, the base section, the side section, the top section, a further side section, and a further base section of the carrier element describe an f-type profile (omega type profile). Preferably, in an exemplary embodiment, the top section comprise a plurality of bolt-holes which penetrate completely through the top section. The bolt hole may then be used to establish the fixing connection by introducing the bolt-body of a bolt into the bolt-hole, wherein a bolt-head of the bolt can be introduced into a recess (or groove) in the lamination sheet section.

Thereby, the carrier element or a plurality of carrier elements form the support structure segment. One or a plurality of lamination sheets of the stator can be coupled to the support structure segment, and therefore the support structure as a whole forms a lamination sheet section of the stator. In particular it is not necessary that lamination sheets are welded to the top surface area of the carrier element. In an exemplary embodiment, the lamination sheets may be removably fixed to the top surfaces of the carrier elements by the respective fixing connections.

Preferably, in the context of the present embodiment of the invention, the axial direction is defined parallel to a rotational axis of the rotor for the generator. The radial direction is the direction running through the rotational axis of the rotor and being perpendicular to the axial direction. The circumferential direction is defined as the direction around the rotational axis being perpendicular to the radial direction and the axial direction.

The support structure segment is preferably used with a generator design, in which the stator is arranged radially outward with respect to the rotor but is not restricted thereto. The support structure segment may also be used in a generator design which has the rotor arranged radially outward with respect to the stator.

In the context of the present embodiment of the invention, a "fixing connection" may be any connection suitable to couple the lamination sheets to the carrier elements of the support structure segment. In particular, a protrusion may be formed or placed on the top section of the respective carrier element, wherein the protrusion, preferably a tail portion of a dove-tail joint, is suitable to match a corresponding recess (or dove type groove) in the lamination sheet section for forming a detachable and removable connection. In such an embodiment the fixing connection may use bolt-holes and/or bolts for a coupling of connection elements (for instance the tail of the dove-tail joint) to the top section of the carrier element. Furthermore, the fixing connection may comprise screw connections.

The coupling of the support structure to the lamination sheet section of the stator by means of a dove tail joint connection allows for high quality connections yielding suitable stability to the assembly. Such connection may be sufficient to meet the requirements of wind turbines.

Preferably, the term "bolt connection" comprises connections which are established by providing a bolt-body in a bolt-hole. The term bolt also comprises any type of fastening means having a head and a body.

The joint between the support structure and the lamination sheet section may be easily accessible when the stator is manufactured. Automated procedures or semi-automated manufacturing processes therefore become advantageously applicable.

The joint between the support structure and the lamination sheet section being easily accessible may also become an advantage when the stator needs to be removed or repaired during the lifetime of the generator. Since the support structure is essentially reversibly attached to the lamination sheet section of the stator, removal or separation of the support structure after the manufacture of the wind turbine may be possible.

In a more particular embodiment of the present invention, bolt-holes are formed in the top section of the carrier element and the fixing connection is established by the head of the bolt which is configured to match a corresponding recess in the lamination sheet section.

In particular, the fixing connection is a dove-tail joint with the tails being on the top section and the corresponding recesses are formed in the lamination sheet section of the stator.

In a more particular embodiment of the present invention, bolt-holes are formed in the top section of the carrier element and the dove-tail joint connection is established by the head of the bolt which is configured to match a corresponding dove-type recess in the lamination sheet section.

In particular, the outer angle $\phi$ may be in a range of approximately 85° to approximately 120° and more in particular in a range of approximately 85° to approximately 105°. Further, the inner angle $\theta$ may be in a range of approximately 850 to approximately 120° and more in particular in a range of approximately 850 to approximately 105°. The inner angle $\theta$ and the outer angle $\phi$ may take approximately the same value.

In particular, the base section essentially extends in the circumferential direction connecting directly to the side section. The side section essentially extends in radial direction. An end of the side section is therefore oriented essentially in radial direction. In this context, the term "essentially extends in radial direction" means that the side section extends in radial direction within the boundaries expressed by the outer angle.

In particular, the side section connects directly to the top section. The top section essentially extends in circumferential direction. The ends of the top section are therefore oriented essentially in circumferential direction. In this context, the term "essentially extends in circumferential direction" means that the top section extends in circumferential direction within the boundaries expressed by the inner angle. In particular, the base section, the side section and the top section form a Z-type profile when viewed along the axial direction.

In particular, the support structure comprises one or a plurality of the above described carrier elements. The carrier elements are arranged spaced apart from each other along the circumferential direction and extend generally along the axial direction. Specifically, a carrier element comprises the above described top section, base section and side section. The top section is arranged within a top plane, the base section is arranged within a base plane and the side section is arranged within the side plane. The top section, the base section and the side section extends parallel with respect to each other along a longitudinal direction, for example along the axial direction. The top plane and the side plane (i.e. their normals) have the inner angle between each other of approximately 70° to approximately 130°, in particular 90°. The base plane and the side plane (i.e. their normals) have an outer angle between each other of approximately 70° to approximately 130°, in particular 90°.

According to an embodiment, the carrier element is a monolithically formed carrier element, in particular a monolithically formed metal carrier element.

The manufacture of a monolithically formed carrier element is cost efficient and allows for easy adaptation of the size and measures of the carrier elements to the size and measures of the generator which it is provided for. Therefore, scaling of the support structure, i.e. adjusting the support structure to generators of different sizes and measure is efficiently possible.

According to an embodiment, the carrier element further comprises a further side section being coupled to the top section and being spaced apart from the side section essentially in circumferential direction.

The expression that the "further side section" is spaced apart from the side section" means in the context of the embodiment of the invention that the further side section and the side section are arranged with respect to each in such a way that there is a recess or opening formed between them. In particular, the further side section and the side section are not in direct contact with each other. In particular, the only element which is placed between the further side section and the side section is the top section, which can therefore be considered as a spacer element.

In particular, the further side section is connected directly to the top section. The further side section essentially extends in radial direction, opposite with respect to the extension of the side section. An end of the further side section is therefore oriented essentially in radial direction. In this context, the term "essentially extends in radial direction" means that the further side section extends in radial direction within the boundaries expressed by a further inner angle which in particular is in the same range as specified for the inner angle and which further inner angle describes the orientation of the top section and the further side section with respect to each other.

In particular, an end section of the support structure segment in circumferential direction is formed by the further side section of the carrier element.

When such a design for the support structure segment is used, no additional element is required for forming the end section of the support structure segment. Rather, the side section of a carrier element of one support structure segment may be coupled to the side section of a carrier element of a further support structure segment. This allows for a cost efficient production of the support structure and an efficient assembly of a plurality of support structure segments to form the complete support structure.

Conclusively, the carrier elements do not only allow for a stable connection of the support structure segment to the lamination structure but in addition allow for establishing a connection in the circumferential direction to adjacent support structure segments.

According to an embodiment, the carrier element further comprises a further base section being coupled to the further side section and being spaced apart from the top section essentially in a radial direction.

In particular, the further base section may connect directly to the further side section. The further base section essentially extends in circumferential direction. An end of the further base section is therefore oriented essentially in circumferential direction. In this context, the term "essentially extends in circumferential direction" means that the further base section extends in circumferential direction within the boundaries expressed by a further outer angle which in particular is in the same range as specified for the outer angle and which further outer angle describes the orientation of the further side section and the further base section with respect to each other. In particular, the base section, the side section, the top section, the further side section and the further base section form an S-type profile (omega-type profile) when viewed along the axial direction.

In particular, the carrier element is symmetrical with respect to a mirror plane, with the mirror plane passing midway through the carrier element in such a way that the top section is essentially perpendicular to the mirror plane and with the mirror plane being perpendicular to the circumferential direction.

This may allow to firmly attach a single bottom plate or a plurality of bottom plates to the base section and/or the further base section which may provide mechanical stabilization to the plurality of carrier elements by connecting the carrier elements in circumferential direction.

Advantageously, an a-type profile can be manufactured from a hot or cold rolled sheet, in particular from a hot or cold rolled steel sheet. Therefore, the manufacturing of the carrier elements becomes easy and cost-efficient.

According to an embodiment, the support structure segment comprises at least two carrier elements.

In particular, the support structure segment comprises at least 3, 4, 5, 6 or 7 or even more carrier elements.

By providing a plurality of carrier elements a stable coupling of the support structure to the lamination sheet section may be achieved. Further, the individual carrier elements of the plurality of separate carrier elements may be spaced apart and openings may be formed between two adjacent carrier elements which allow for a flow of air in a radial direction.

According to an embodiment, the support structure segment further comprises a plate element extending at least between the at least two carrier elements in a circumferential direction.

In particular the plate element is coupled to the side section or the further side section of each of the at least two carrier elements.

This provides mechanical stabilization to the carrier elements which are connected in this way in circumferential direction.

According to an embodiment, the plate element extends essentially from an end section of the support structure segment to an opposite further end section of the support structure segment in the circumferential direction, i.e. forming a ring structure.

A plurality of ring structures, each formed by a single plate element in circumferential direction, provide mechanical stabilization to the plurality of carrier elements by connecting the carrier elements in circumferential direction. Thereby, the carrier elements are hold firmly and accurately in place, which enables the stable coupling of the lamination sheet section to the support structure segment by fixing connections.

According to an embodiment, a plurality of plate elements are aligned in the circumferential direction extending essentially from an end section of the support structure segment to an opposite further end section of the support structure segment in the circumferential direction.

In this embodiment, each or at least one of the ring structures is formed by a plurality of plate elements coupled to each other in circumferential direction providing mechanical stabilization to the plurality of carrier elements. Advantageously, this allows at the same time for an easy replacement easily during the lifetime of the generator.

According to an embodiment, the plate element further comprises a channel configured to channel air in the axial direction.

The channels allow for an axial air flow and cooling when the generator is active.

According to an embodiment, the support structure segment further comprises a top plate, wherein the top plate is coupled to the carrier element connecting the at least two carrier elements in the circumferential direction.

According to an embodiment, the connecting of the at least two carrier elements by the top plate in circumferential direction leaves at least a portion of the top section of the carrier element uncovered. This advantageously allows for a direct coupling of the top plate to a lamination sheet section by means of a fixing connection.

The top plate provides mechanical stabilization to the plurality of carrier elements by connecting the carrier elements in circumferential direction.

According to a further embodiment, the support structure segment comprises a top plate coupled to at least two carrier elements and at least one plate element extending between the at least two carrier elements in a circumferential direction. In particular, the top plate is coupled to the top section of the carrier element in circumferential direction but leaves at least a portion of the top section of the carrier element uncovered and the plate element is coupled to the side section or the further side section of each of the at least two carrier elements.

Thereby, the at least two carrier elements are stabilized in the circumferential direction in a twofold way, i.e. by the plate elements and the top plate.

According to an embodiment, the support structure segment further comprises a bottom plate, wherein the bottom plate is coupled to the carrier element, preferably to the base section of the carrier element, connecting the at least two carrier elements in the circumferential direction.

The bottom plate provides mechanical stabilization to the plurality of carrier elements by connecting the carrier elements in circumferential direction. Thereby, the carrier elements are hold firmly and accurately in place, which enables the stable coupling of the lamination sheet section to the support structure segment by fixing connections.

According to a further embodiment, the support structure segment comprises a bottom plate coupled to base section of at least two carrier elements and at least one plate element extending between the at least two carrier elements in a circumferential direction.

Thereby, the at least two carrier elements are stabilized in the circumferential direction in a twofold way, i.e. by the plate elements and the bottom plate.

According to a further embodiment, the support structure segment comprises a top plate coupled to at least two carrier elements and at least one plate element extending between the at least two carrier elements in a circumferential direction and a bottom plate coupled to the at least two carrier elements. In particular, the top plate is coupled to the top section of the carrier element in circumferential direction but leaves at least a portion of the top section of the carrier element uncovered and the plate element is coupled to the side section and/or the further side section of each of the at least two carrier elements and the bottom plate is coupled to the base section and/or the further base section of the carrier element in circumferential direction.

Thereby, the at least two carrier elements are stabilized in the circumferential direction in a threefold way, i.e. by the top plate, the plate elements and the bottom plate.

Another aspect of the embodiment of the invention relates to a stator for a generator, in particular of a wind turbine, wherein the stator comprises a lamination, a sheet section, and a support structure, wherein the support structure comprises a plurality of support structure segments and the lamination sheet section of the stator is coupled to the top section of the carrier element by means of a dove-tail joint connection.

According to another embodiment of the invention, the stator comprises at least two support structure segments which are coupled to each other by means of at least one block element between corresponding end sections of the two support structure segments in the circumferential direction.

In particular, the end sections of the support structure segments in circumferential direction are each formed by a side section of the carrier element and the at least one block element is in contact with the side sections of the carrier element.

By such an architecture, no additional end segment is required. This allows for a cost efficient production of the support structure. Further a mechanically stable assembly of the support structure segment is achieved to form the complete support structure. Conclusively, the carrier elements act in a twofold way, they do not only allow for a stable connection of the support structure segment to the lamination structure but in addition allow for establishing a stable connection in the circumferential direction to adjacent support structure segments in combination with the block element.

Another aspect of the embodiment of the invention relates to a method for manufacturing of a stator. The method comprises providing a lamination sheet section and providing a support structure, wherein the support structure comprises a plurality of support structure segments and wherein the lamination sheet section of the stator is coupled to the top section of the carrier element by means of a fixing connection, preferably by means of a dove-tail joint connection.

The term "dove-tail joint" in the context of the present embodiment of the invention also comprises embodiments in which instead of bolts only tails are provided on the top sections of the carrier elements and no bolt-holes are required.

In an embodiment, bolt heads of bolts inserted in the top section of the carrier element, correspond to the tails of the dove-tail joint.

The dove-tail joint is very strong because of the way the bolt heads, corresponding to the tails, and the respective recesses in the lamination sheet section are shaped. Therefore, the dove-tail joint enables a stable coupling of the lamination sheet section to the support structure segment.

Further, this enables a very flexible connection which may be in particular of advantage when the stator needs to be removed or repaired during the lifetime of the generator. Since the support structure is essentially reversibly attached to the lamination sheet section of the stator, removal or separation of the support structure is efficiently possible.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present embodiment of the invention are apparent from the examples of embodiment to be described hereinafter and are explained with reference to the examples of embodiment. The embodiment of the invention will be described in more detail hereinafter with reference to examples of embodiment but to which the invention is not limited.

Summarizing in the present embodiment of the invention the lamination sheet stacks are preferably bolted onto the support structure (in particular onto a support structure segment) via a dove tail and key connection. The support structure is made of bended steel plates (i.e. carrier elements, in particular having an omega-profile) preferably welded at the ends to steel plates (i.e. pressure-plates). In particular, the omega-profiles are either split and welded onto a number of steel plates or ring-plates (i.e. plate elements) or the ring-plates are split and welded onto the sides and insides of the omega-profiles. In particular, at the profile ends, flanges (i.e. base sections) may be shaped in order to reduce hot spot stress. Adjacent segments are bolted together at the outmost located omega-profiles (i.e. end sections), wherein one of the flanges (i.e. base section, further base section) has been removed from these profiles. Steel blocks are optionally welded to these profiles.

As explained above either the omega-profiles (i.e. the carrier elements) or the ring-plates (i.e. the plate elements) can be split. Each omega-profile section can be shaped in order to reduce hot spot stress. This has the advantage of only requiring one fixation setup for the welding process. Welding can be done from the outside with only one easy accessible start and stop for each omega-profile welding.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION

Some of the embodiments will be described in detail, with references to the following Figures, wherein like designations denote like members, wherein:

FIG. 3 shows a carrier element of the support structure segment according to an embodiment of the invention, in a perspective view;

FIG. 4 shows a segment of a stator with the stator comprising a support structure segment and a segment of the lamination sheet section coupled to the support structure, in a cross-sectional view along the axial direction;

FIG. 5 shows a segment of a stator according to the embodiment of the invention as shown in FIG. 4, in a perspective view onto the bottom;

DETAILED DESCRIPTION

Figure 1:
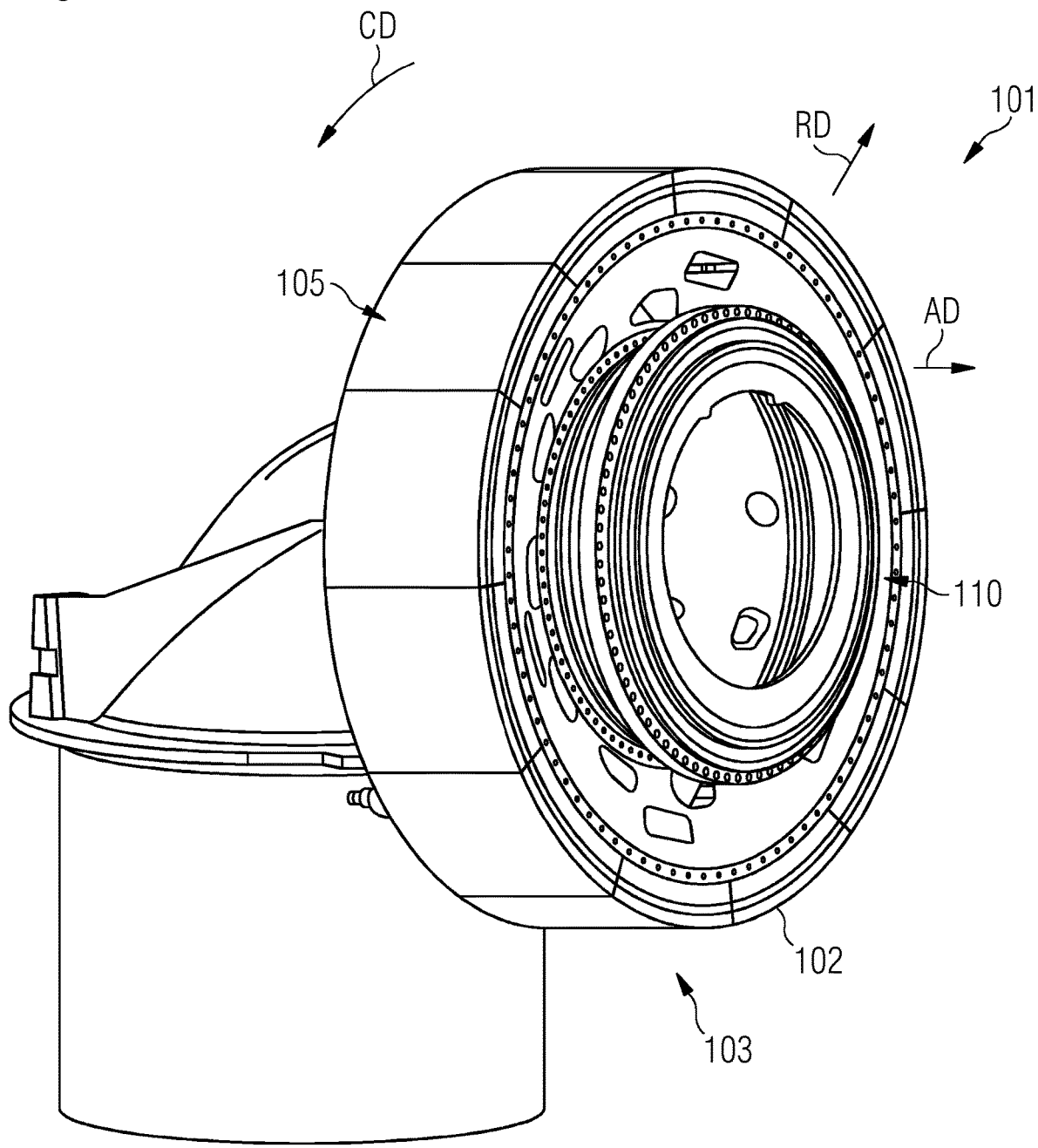
FIG. 1 shows a generator comprising a rotor and a stator, with the stator comprising a support structure being composed of a plurality support structure segments, in a perspective view.

The illustrations in the drawings are schematically. It is noted that in different figures, similar or identical elements are provided with the same reference signs.

Further, spatially relative terms, such as "front" and "back", "above" and "below". "left" and "right", et cetera are used to describe an element's relationship to another element(s) as illustrated in the figures. Thus, the spatially relative terms may apply to orientations in use which differ from the orientation depicted in the figures. Obviously all such spatially relative terms refer to the orientation shown in the figures only for ease of description and are not necessarily limiting as an apparatus according to an embodiment of the invention can assume orientations different than those illustrated in the figures when in use.

FIG. 1 shows a generator 101, in particular for a wind turbine, with a rotor 110 and a stator 103. The rotor 110 rotates about an axis defining an axial direction AD. The movement of the outer part of the rotor 110 defines a circumferential direction CD. The direction pointing outward from the center of the generator is defined as the radial direction RD.

The stator 103 of the generator 101 comprises a lamination sheet section (not shown in FIG. 1), and a support structure 102. The support structure 102 is composed of a plurality of support structure segments 105. Each of the support structure segments 105 is coupled to an adjacent support structure segment 105 in the circumferential direction CD with respect to the rotational movement of the generator.

The support structure 102 is arranged between the lamination sheet section (not shown) and the rotor 110.

Figure 2:
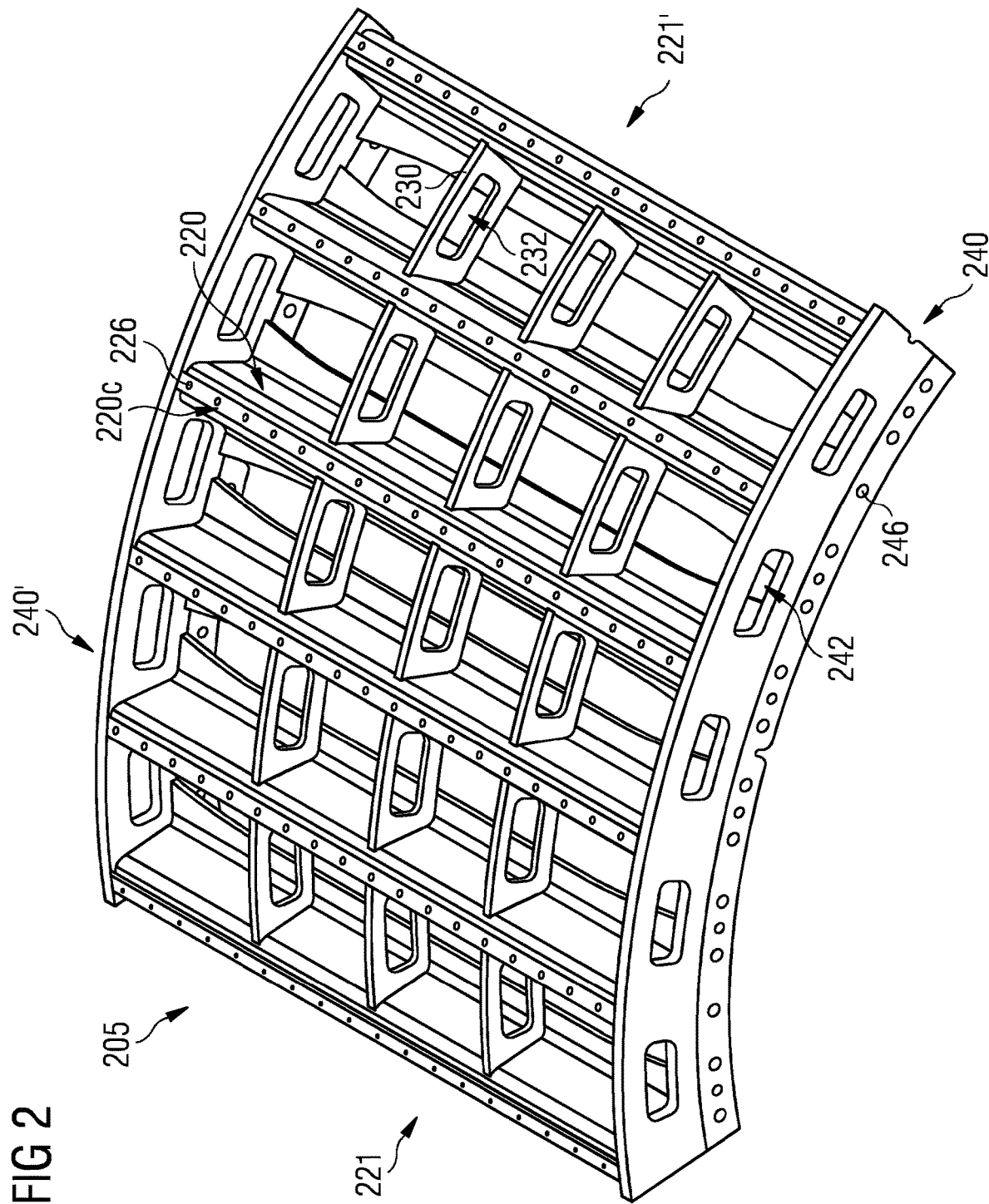
FIG. 2 shows a support structure segment according to an embodiment of the invention, in a perspective view onto the top.

FIG. 2 shows a support structure segment 205 according to an embodiment of the invention, in a perspective view onto the top of the segment. The support structure segment 205 is configured for use in a stator of a wind turbine. The support structure segment 205 comprises a plurality of carrier elements 220. Each carrier element 220 extends in an axial direction AD. The carrier element 220 has a corrugated shape with a top section 220c. The top section 220c of the carrier element 220 forms a plateau. In the top section 220c of the carrier element 220, a plurality of bolt-holes 226 are formed which are configured to take up a bolt.

The support structure segment 205 further comprises a plurality of plate elements 230, stacked in axial direction AD. Each of the plurality of plate elements 230 extends in the circumferential direction CD. Each of the plate elements 230 extends essentially from an end section 221 of the support structure segment 205 to an opposite further end section 221' of the support structure segment 205 in the circumferential direction CD. Therefore, each plate element 230 can be considered as a ring structure formed in the circumferential direction CD of the support structure segment 205. Each plate element 230 extends in circumferential direction CD through size-tailored recesses in the carrier elements 220, which recesses correspond to the dimensions and shape of the plate element 230. In another embodiment the plate elements 230 may be welded to the side sections of the carrier elements 220. In yet another embodiment, the carrier elements 220 may be segmented with each segment being coupled, for instance welded, to the plate elements 230 in axial direction.

Instead of having each ring structure formed by a single plate element 230, each ring structure may be formed by alignment of a plurality of single plate elements 230 adjacent to each other in the circumferential direction CD. Each plate element 230 is coupled in circumferential direction CD to a carrier element 220, in particular to a side section and/or a further side section of a carrier element 220, for instance by welding and/or by a bolt-type connection. In such an embodiment, each plate element 230 is placed between neighboring carrier elements 220 and is coupled the side sections of the neighboring carrier elements 220.

The ring structures (or ring-plates) have multiple purposes. Firstly, they stabilize the side sections and base sections of the carrier elements, in particular of omega-type profiles. Secondly, they form rings in the segmented stator assembly via the segment-to-segment bolt connection. These rings help reducing radial deformation. Thirdly, they help distributing the tangential EM forces evenly onto the carrier elements, in particular the omega-type profiles.

The plate elements comprise channels 232 which allow for air flow and cooling in axial direction AD when the generator is active.

The support structure segment 205 further comprises a pressure plate 240 at one end of the support structure segment 205 in axial direction and a further pressure plate 240' at the opposite end of the support structure segment 205 in axial direction.

Each of the two pressures plates 240, 240' comprises a plurality of channels 242 which allow for air flow and cooling in axial direction AD w % en the generator is active.

Each of the two pressures plates 240, 240' comprises a plurality of bolt-holes 246. By means of the plurality of bolt-holes 246, each of the two pressures plates 240, 240' may be coupled to the rotor of the generator. Alternatively, the two pressures plates 240, 240' may be welded to a rotor of a generator.

FIG. 3 shows a carrier element 220 of the support structure segment 205 according to an embodiment of the invention, in a perspective view. The carrier element 220 comprises a base section 220a, a further base section 220a', a side section 220b, a further side section 220b' and a top section 220c.

The base section 220a and the side section 220b are oriented relative to each other at an outer angle φ having a value of approximately 90°. The side section 220b and the top section 220c are oriented relative to each other at an inner angle θ having a value of approximately 90°.

The further base section 220a' and the further side section 220b' (in an analogous way to the base section 220a and the side section 220b, respectively) are oriented relative to each other at a further outer angle also having a value of approximately 90°. The further side section 220b' and the top section 220c (in an analogous way to side section 220b and the top section 220c) are oriented relative to each other at a further inner angle having a value of approximately 90°.

The top section 220c is configured to be coupled to a lamination sheet section of the stator. This connection is established by means of a fixing connection. In order to establish such a fixing connection a bolt-hole is provided in the top section 220c. To this end, the top section 220c forms a plateau which has a suitably extended surface area to enable the formation of bolt-holes therein and to firmly secure a bolt in the bolt-hole.

The base section 220a and the further base section 220a' are configured as flange elements for attaching for instance a bottom plate.

In the embodiment of FIG. 3, the side section 220b and further side section 220b' are oriented essentially parallel to each other. The same holds for the top section 220c with respect to both, the base section 220a and the further base section 220a'.

Each, the base section 220a and the further base section 220a', comprises channels which allow for a radial air flow and cooling when the generator is active. The channels of the base section 220a and/or the further base section 220a' preferably are present as a plurality of parallel slits elongated in circumferential direction CD.

In the embodiment shown in FIG. 3, the carrier element 220 is a single-piece carrier element, in particular a monolithically formed carrier element of a metal or a metal alloy. The base section 220a, the side section 220b, the top section 220c, the further side section 220b' and the further base section 220a' constitute the carrier element, in this order. At the transition from base section 220a to the side section 220b, from the side section 220b to the top section 220c, from the top section 220c to the further side section 220b' and from the further side section 220b' to the further base section 220a', the carrier element 220 forms rounded edges.

Summarizing, each carrier element 220 has a corrugated shape, which in the embodiment as shown in FIG. 3 has a single corrugation forming a shape that can be described as an omega. Such an f-type (omega-type) profile is different to the known profiles, which have only a relatively narrow top section. As such known profiles do not provide a plateau with a suitably extended surface area such known profiles may form only lower quality connections to the stator. As the profiles according to the embodiment of the invention have a side section and a further side section spaced apart they can be manufactured efficiently.

FIG. 4 shows a segment of the stator 403 with the stator comprising a support structure segment 205 and a segment of the lamination sheet section 408, in a cross-sectional view along the axial direction.

The support structure segment 205 presented in FIG. 4 corresponds to the support structure described in FIG. 2. FIG. 4 illustrates the assembly of the support structure segment 205 and the lamination sheet section 408, i.e. it is illustrated how the support structure segment 205 may be coupled to the lamination sheet section 408 in order to form (a segment of) the stator 403.

The top section 220c of the carrier element 220 in FIG. 4 is coupled to the lamination sheet section 408 of the stator 403. This connection is established by means of a fixing connection. To do so, a bolt-hole is provided in the top section 220c of the carrier element 220. In this regard, it is exploited that the top section forms a plateau which has an extended surface area to enable the formation of the bolt-hole therein. A bolt 450 forms a bolt connection with the lamination sheet section 408 in the form of a dove-tail joint connection. The bolt 450 comprises a body 450a and a head 450b. The body 450a of the bolt 450 is introduced into the bolt-hole in the top section of the carrier element 220. The head 450b of the bolt 450 is connected to a corresponding recess 408a in the lamination sheet section 408.

The lamination sheet section 408 is composed of a plurality of laminated sheets stacked in axial direction AD. In FIG. 4 it is illustrated that a single laminated sheet of the sheet section 408 is coupled to the support structure segment 205 by means of a dove-tail joint connection formed by a plurality of bolts 450.

As the lamination sheet section 408 is composed of a plurality of sheets stacked in axial direction, further sheets of the laminated sheet section (being placed in front of or behind in axial direction—not shown in FIG. 4) may be coupled to the support structure segment 205 by means of a dove-tail joint connection formed by a plurality of bolts 450 in the same way as illustrated in FIG. 4.

FIG. 5 shows a segment of the stator 403 according to the embodiment of the invention as shown in FIG. 4, in a perspective view onto the bottom. The support structure segment 205 comprises a plurality of carrier elements 220, wherein each of the plurality of carrier elements 220 extends in an axial direction AD. The perspective view onto the bottom of the support structure segment 205 illustrates that there are openings formed between two adjacent carrier elements 220 which allow for a flow of air in a radial direction.

The perspective view onto the bottom of the support structure segment 205 further illustrates that the bolt-body 450a of each of the bolt in the carrier elements 220 extends in radial direction.

In the embodiment shown in FIG. 5, the end sections 221, 221' of the support structure segment 205 are formed by additional end section plates 423.

Figure 6:
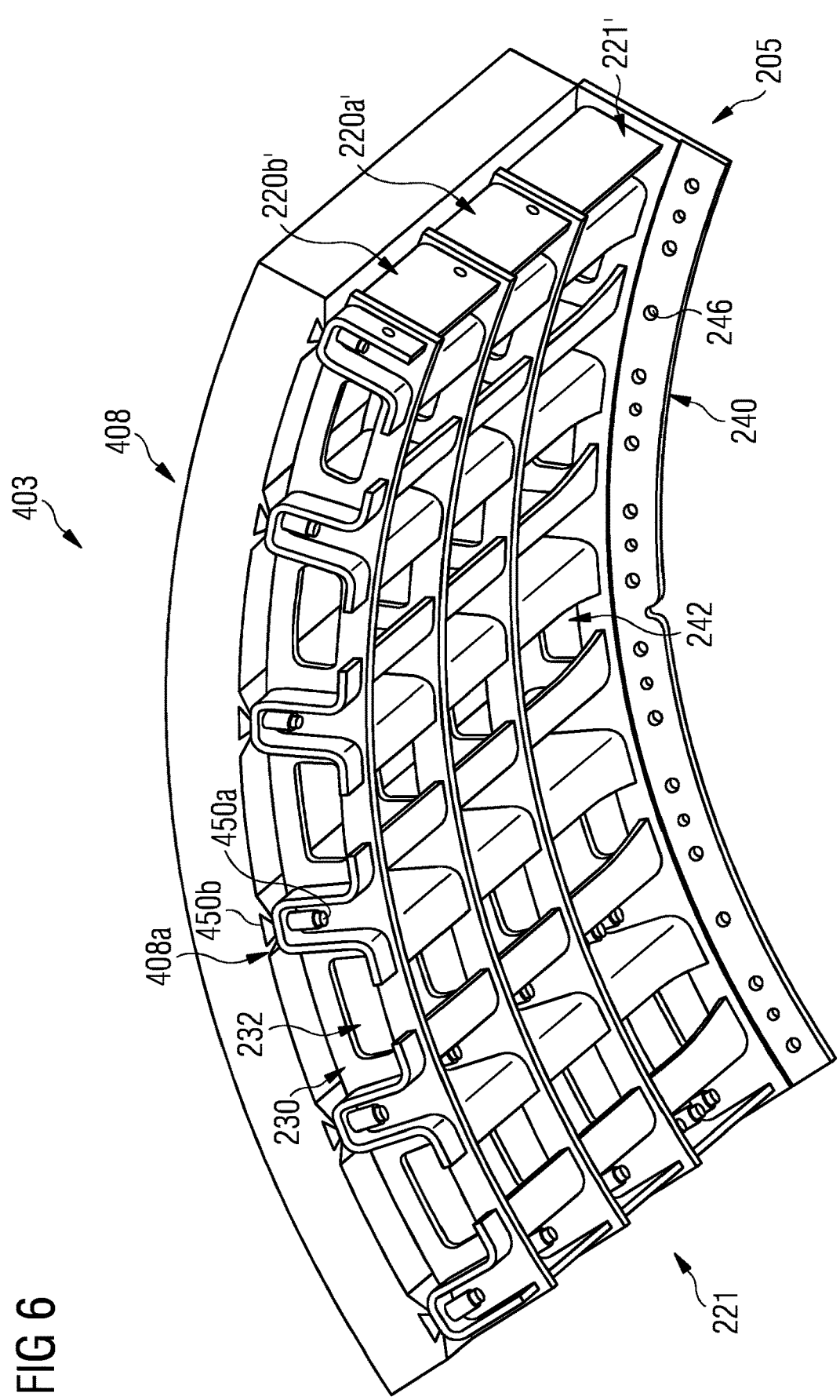
FIG. 6 shows a segment of a stator according to the embodiment of the invention as shown in FIG. 4 and FIG. 5, in a perspective view.

FIG. 6 shows a segment of the stator 403 according to a further embodiment of the invention, in a perspective view. FIG. 6 illustrates clearly that the head 450b of the bolt 450 is connected to a corresponding recess 408a in the lamination sheet section 408. The various sheets of the lamination sheet section 408 are not depicted individually. From FIG. 6 the ring-type structure of the support structure segment 205 is apparent. The plate elements 230 extend in the circumferential direction CD, forming a ring structure in the circumferential direction CD of the support structure segment 205. There are several ring structures (which may each be formed by a single plate element 230 or by a plurality of adjacent plate elements 230) in the support structure segment 205.

The ring structures provide mechanical stabilization to the plurality of carrier elements 220 by connecting the carrier elements 220 in circumferential direction. Thereby, the carrier elements 220 are hold firmly and accurately in place, which enables the stable coupling of the lamination sheet section 408 to the support structure segment 205 by fixing connections.

An end section 221' of the support structure segment 205 in circumferential direction CD is formed by a (further) side section 220b' of the carrier element 220 which is placed most outwardly in circumferential direction of the support structure segment 205. The same holds for the corresponding opposite further end section 221'. The (further) side section 220b' comprises bolt holes 220d for establishing a connection to an adjacent support structure segment.

Figure 7:
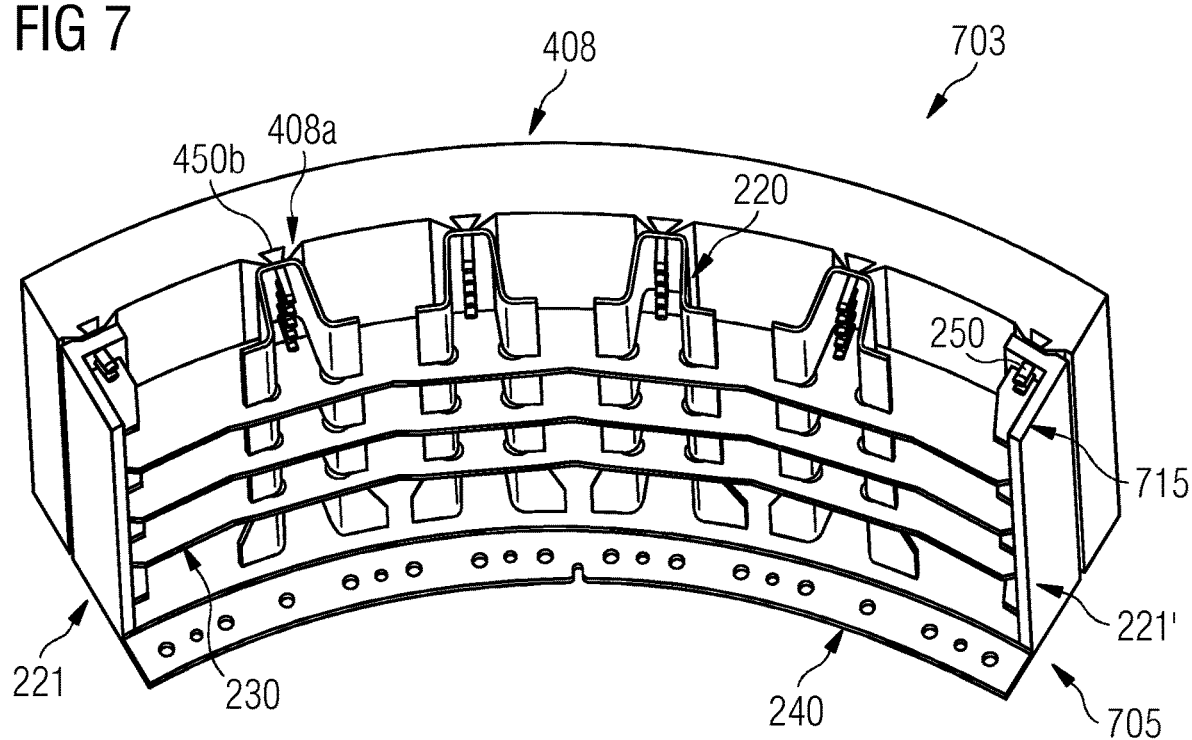
FIG. 7 shows a segment of a stator with the stator comprising a support structure segment and a segment of the lamination sheet section coupled to the support structure, according to another embodiment of the invention, in a perspective view.

FIG. 7 shows a segment of the stator 705 according to another embodiment of the invention, in a perspective view. In the embodiment of FIG. 7, an end section 221' of the support structure segment 705 in circumferential direction CD is formed by an L-shaped element 715 placed outwardly from the plurality of carrier elements 220 in circumferential direction of the support structure segment 705. The same holds for the corresponding opposite further end section 221 where a further L-shaped element is placed.

Figure 8:
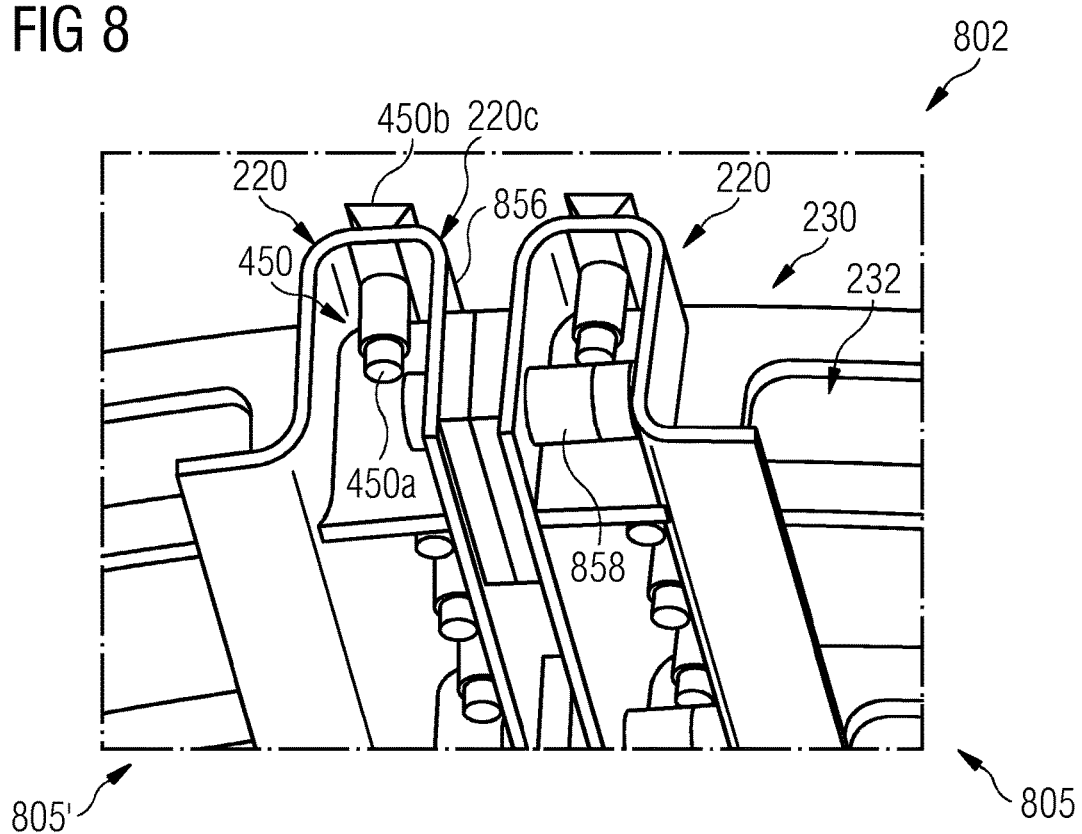
FIG. 8 shows two support structure segments coupled to each other according to an embodiment of the invention, in a perspective view.

FIG. 8 shows two support structure segments 805, 805' coupled to each other according to an embodiment of the invention, in a perspective view.

The support structure of a stator comprises a plurality of support structure segments 805, 805'. FIG. 8 demonstrates how two adjacent support structure segments 805, 805' may be coupled together to form the support structure.

According to the embodiment of FIG. 8, the two adjacent support structure segments 805, 805' are coupled to each other by two block elements 856, both of which are essentially of the same size. The two block elements are placed between respective end sections of 221 of the two support structure segments 805, 805' in the circumferential direction CD. The end sections 221 of the support structure segments 805, 805' in circumferential direction CD are formed by respective side sections of the respective carrier elements 220 of the support structure segments 805, 805'. The two block elements 856 are attached to each other and to the end sections 221 of the support structure segments 805, 805' by a bolt connection 858. Alternatively, a single block element 856 may be used, which may be attached to the end sections 221 of the support structure segments 805, 805' by a bolt connection 858 or by welding.

Figure 9:
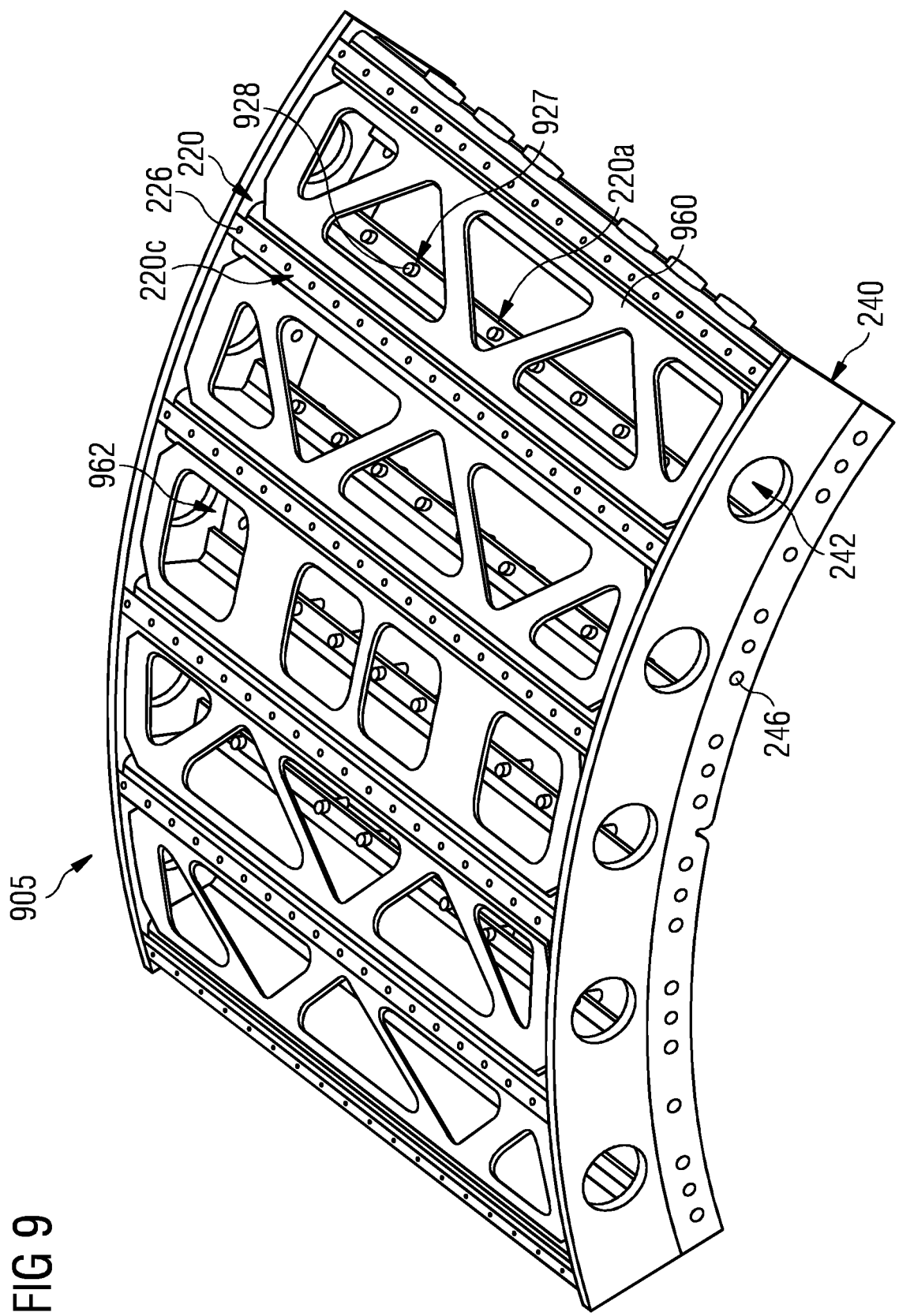
FIG. 9 shows a support structure segment according to another embodiment of the invention, in a perspective view onto the top.

FIG. 9 shows a support structure segment 905 according to another embodiment of the invention, in a perspective view onto the top. The support structure segment 905 comprises a plurality of top plates 960. Each top plate 960 may be coupled to the carrier element 220 connecting the at least two carrier elements 220 in the circumferential direction CD.

Each top plate 960 extends in the axial direction of the support structure 905 and is placed in such a way that when being connected to the at least two carrier elements 220, the top plate 960 in circumferential direction leaves at least a portion of each top section 220c of the carrier element 220 uncovered. In this uncovered section a plurality of through holes 226 are provided, which allow for a coupling of the support structure segment 905 to a lamination sheet section by a fixing connection.

The top plate 960 provides mechanical stabilization to the plurality of carrier elements 220 by connecting the carrier elements 220 in circumferential direction CP.

As also apparent from FIG. 9, a plurality of bolt-holes 927 and bolts 928 are provided in the base section 220a for coupling of a bottom plate.

Each top plate 960 comprises channels 962 which allow for a radial air flow and cooling when the generator is active.

The top plates 960 provide mechanical stabilization to the plurality of carrier elements 220 by connecting the carrier elements 220 in circumferential direction. Thereby, the carrier elements 220 are held in place. This enables the stable coupling of a lamination sheet section to the support structure segment 905 by fixing connections, in particular by dove-tail joints.

Figure 10:
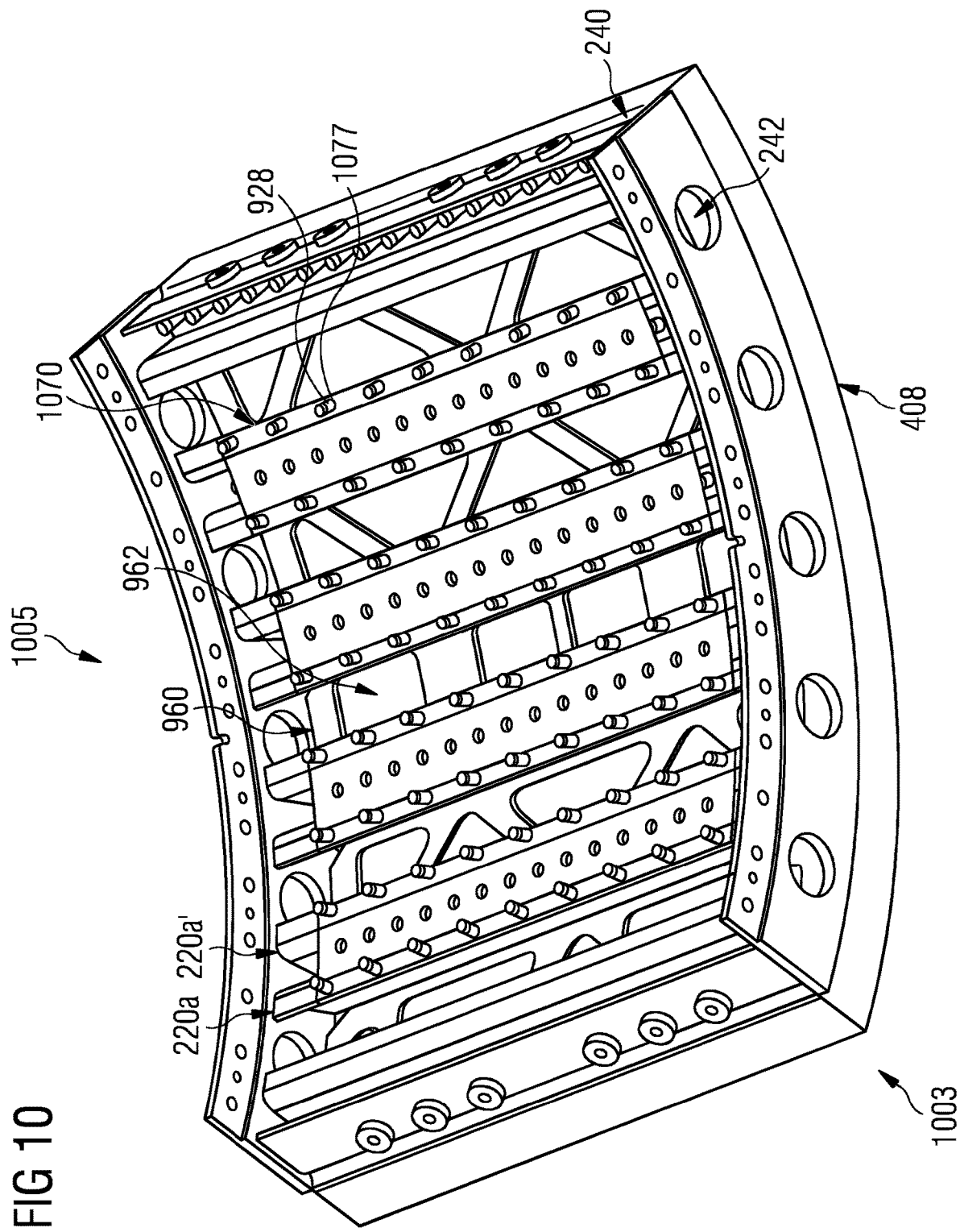
FIG. 10 shows a segment of a stator with a support structure segment according to another embodiment of the invention, in a perspective view onto the bottom.

FIG. 10 shows a segment of the stator 1003 with a support structure 1005 according to another embodiment of the invention, in a perspective view onto the bottom.

The support structure segment 1005 comprises a plurality of top plates 960 as described in FIG. 9. The perspective view onto the bottom of the support structure segment 1005 illustrates that there are openings between two adjacent carrier elements 220. Through these openings the top plates 960 are visible in FIG. 10.

The support structure segment 1005 further comprises a plurality of bottom plates 1070. Each bottom plate 1070 extends in an axial direction of the support structure 1005. The bottom plate is coupled to the base sections 220a, 220a' of the carrier element 220. The base sections 220a, 220a' serve as flange sections. The bottom plate 1070 comprises through holes 1077 which allow for establishing a bolt connection to the base sections 220a. 220a' by means of the bolts 928. Thereby, the bottom plate 1070 is attached firmly and accurately to the carrier element 220.

The bottom plate 1070 provides mechanical stabilization to the plurality of carrier elements 220 by connecting the carrier elements 220 in circumferential direction. In an alternative embodiment, in addition to the stabilization achieved by the bottom plate and/or the top plate there may be several ring plate structures extending in circumferential direction (which may each be formed by a single plate element 230 or by a plurality of adjacent plate elements 230) in the support structure segment 205.

The bottom plate 1070 comprises further through holes or channels which allow for a radial air flow and cooling when the generator is active.

Figure 11:
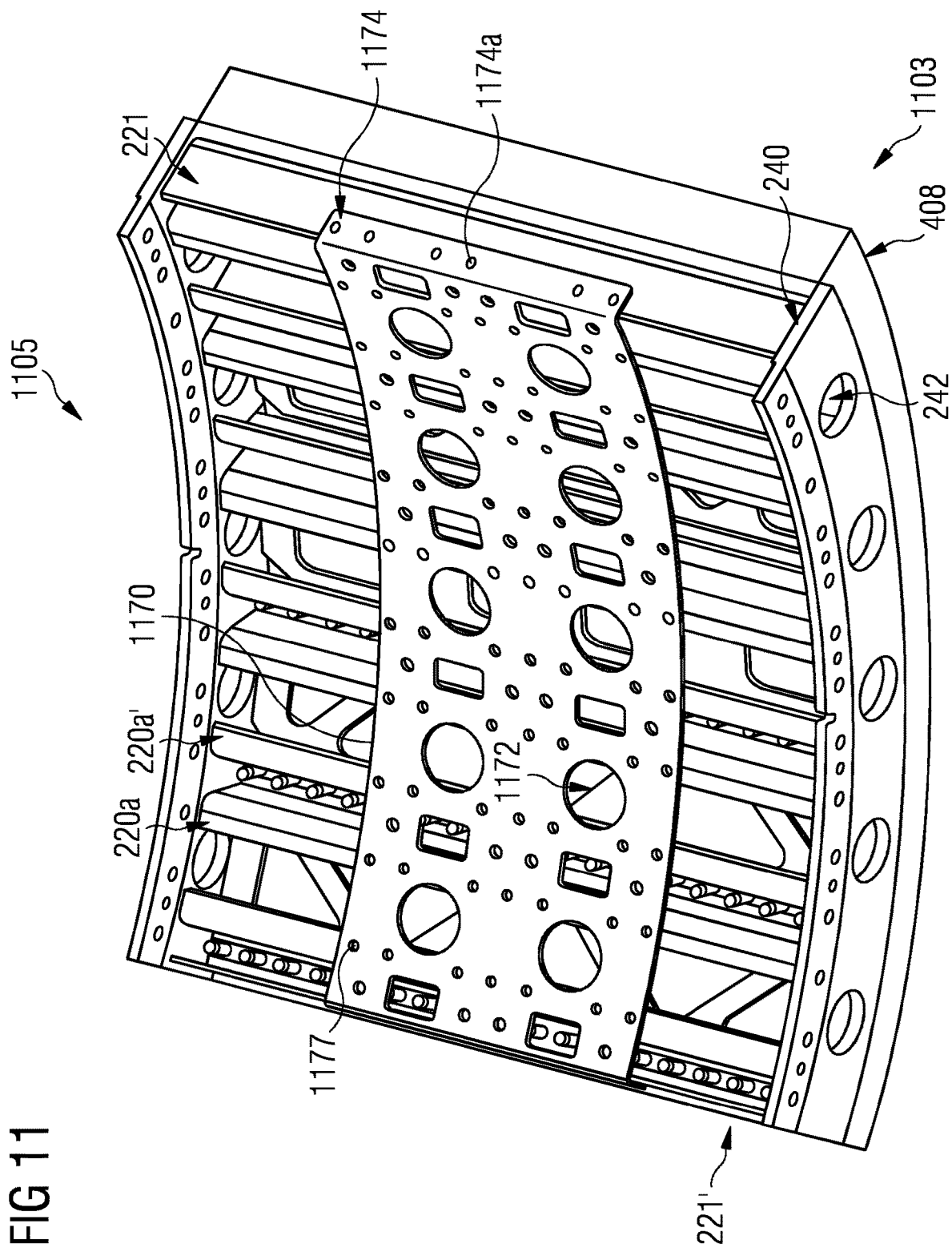
FIG. 11 shows a segment of a stator with a support structure segment according to another embodiment of the invention, in a perspective view onto the bottom.

FIG. 11 shows a segment of the stator 1103 with a support structure 1105 according to another embodiment of the invention, in a perspective view onto the bottom.

The support structure segment 1105 further comprises a single bottom plate 1170. The single bottom plate 1170 extends in a circumferential direction of the support structure 1005. The bottom plate is coupled to the base sections of the carrier element 220 serving as flange sections. The bottom plate 1170 comprises through holes 1177 which allow for establishing the bolt connection to the base sections 220a, 220a' of the carrier element.

As the bottom plate 1170 is formed as a single bottom plate extending in a circumferential direction, it has a suitably extended surface area to allow for the presence of relatively large air channels 1172 which allow for a radial air flow and cooling when the generator is active. Further, the bottom plate is coupled to the end sections 221, 221' of the support structure segment 1105 by forming an L-shaped structure 1174 with bolt-holes 1174a. This is possible since the bottom plate extends essentially from an end section 221 of the support structure segment 1105 to an opposite end section 221' of the support structure segment in the circumferential direction CD. Due to the L-shaped structure, the bottom plate 1170 is attached firmly to the support structure segment 1105 by means of a bolt connection and/or welding.

Figure 12:
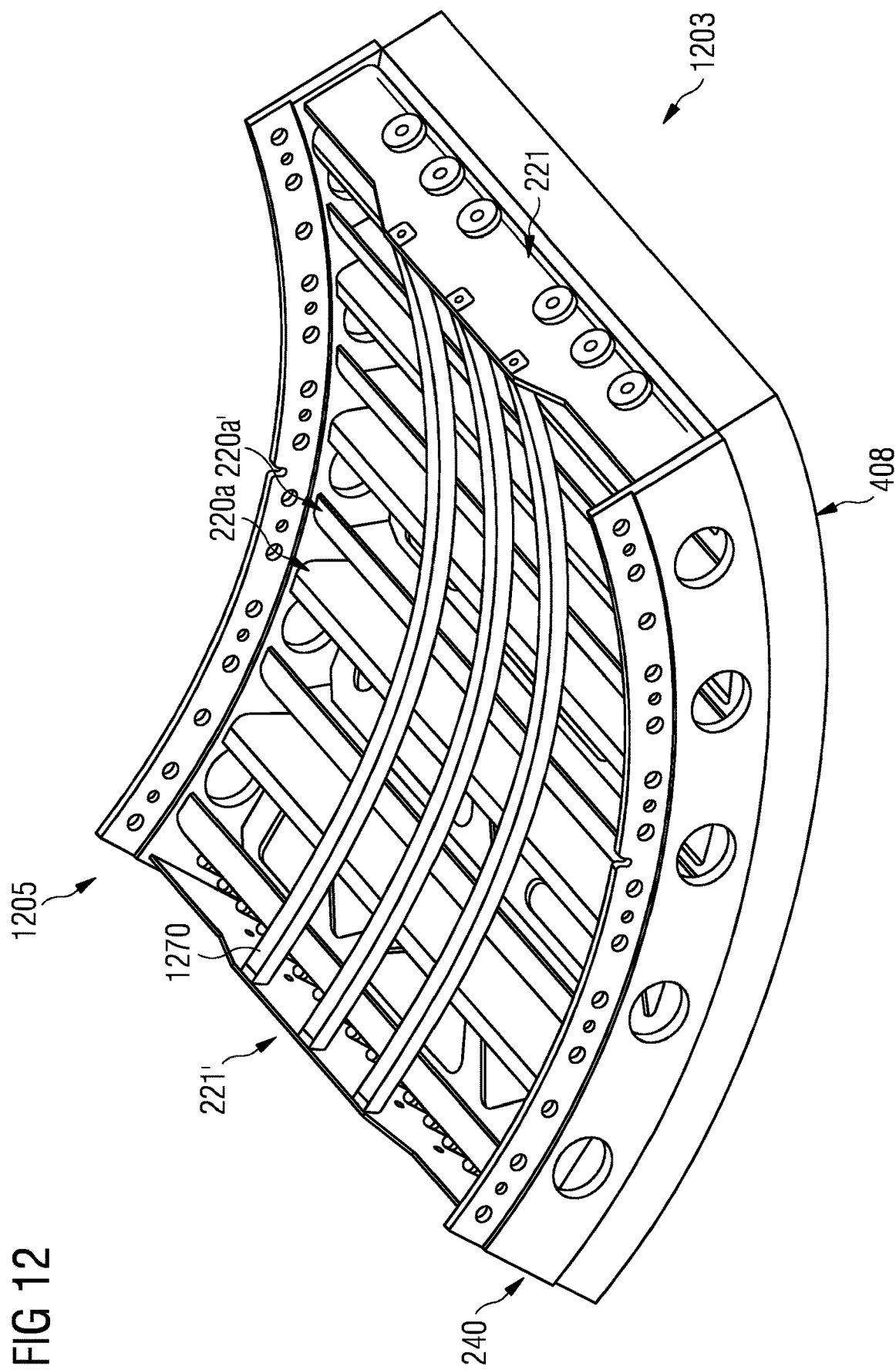
FIG. 12 shows a segment of a stator with a support structure segment according to another embodiment of the invention, in a perspective view onto the bottom.

FIG. 12 shows a segment of the stator 1203 with a support structure 1205 according to another embodiment of the invention, in a perspective view onto the bottom.

The support structure segment 1205 comprises a plurality of ring shaped bottom structures 1270, i.e. U-beams, which are bended and curved and which may be welded or bolted to the carrier elements 220.

The support structure segment 1205 further comprises a plurality of bottom plates 1270. Each ring shaped bottom structure 1270 extends in an axial direction of the support structure 1205. The ring shaped bottom structures are coupled to the base sections 220a, 220a' of the carrier element 220 for instance by welding, i.e. the base sections 220a, 220a' serve as attachments sections.

The ring structures provide mechanical stabilization to the plurality of carrier elements 220 by connecting the carrier elements 220 in circumferential direction. Thereby, the carrier elements 220 are hold firmly and accurately in place, which enables the stable coupling of a lamination sheet section to the support structure segment 1205 by bolt connections.

The end sections of two support structure segments 1205 may be connected by means of the ring shaped bottom structures 1270.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A support structure segment for a stator of a generator of a wind turbine, the support structure segment comprising:
   a carrier element extending in an axial direction, wherein the carrier element comprises a base section, a side section and a top section, wherein:
   the base section and the side section are oriented relative to each other at an outer angle in a range of 70° to 130°,
   the side section and the top section are oriented relative to each other at an inner angle in a range of 70° to 130°,
   the base section is coupled to the side section,
   the side section is coupled to the top section,
   the base section is spaced apart from the top section in a radial direction, and
   the top section is configured to be coupled to a lamination sheet section of the stator by a fixing connection.

2. The support structure segment according to claim 1, wherein
   the carrier element is a monolithically formed metal carrier element.

3. The support structure segment according to claim 1, wherein the carrier element further comprises:
   a further side section being coupled to the top section wand being spaced apart from the side section essentially in circumferential direction, wherein;
   an end section of the support structure segment in circumferential direction is formed by the further side section of the carrier element.

4. The support structure segment according to any of the claim 1, wherein the carrier element further comprises:
   a further base section being coupled to the further side section and being spaced apart from the top section essentially in a radial direction.

5. The support structure segment according to claim 1, wherein the support structure segment comprises at least two carrier elements.

6. The support structure segment according to claim 5, wherein the support structure segment further comprises a plate element extending at least between the at least two carrier elements in a circumferential direction.

7. The support structure segment according to claim 6, wherein the plate element extends essentially from an end section of the support structure segment to an opposite further end section of the support structure segment in the circumferential direction.

8. The support structure segment according to claim 6, wherein
a plurality of plate elements are aligned in the circumferential direction extending essentially from an end section of the support structure segment to an opposite further end section of the support structure segment in the circumferential direction.

9. The support segment according to claim 6,
wherein the plate element further comprises a channel configured to channel air in the axial direction.

10. The support structure segment according to claim 5, wherein the support structure segment further comprises
a top plate,
wherein the top plate is coupled to the carrier element connecting the at least two carrier elements in the circumferential direction.

11. The support structure segment according to claim 10, wherein the connecting of the at least two carrier elements by the top plate in circumferential direction leaves at least a portion of the top section of the carrier element uncovered by the top plate to allow a coupling of the top plate to a lamination sheet section by means of a fixing connection.

12. The support structure segment according any of the claim 5, wherein the support structure segment further comprises a bottom plate, wherein the bottom plate is coupled to the carrier element preferably to the base section the carrier element, connecting the at least two carrier elements in the circumferential direction.

13. A stator for a generator, in particular of a wind turbine, the stator comprising:
a lamination sheet section, and
a support structure, wherein
the support structure comprises a plurality of support structure segments according to claim 1, and
the lamination sheet section of the stator is coupled to the top section of the carrier element by means of a dove-tail joint connection.

14. The stator according to claim 13, wherein
at least two support structure segments of the plurality of support structure segments are coupled to each other by means of at least one block element between corresponding end sections of the two support structure segments in the circumferential direction.

15. A method for manufacturing of a stator, the method comprising:
providing a lamination sheet section;
providing a support structure,
wherein the support structure comprises a plurality of support structure segments according to claim 1,
coupling the lamination sheet section of the stator to the top section of the carrier element by means of a fixing connection, by means of a dove-tail joint connection.

* * * * *